(12) United States Patent
Sekino et al.

(10) Patent No.: US 8,277,987 B2
(45) Date of Patent: Oct. 2, 2012

(54) FUEL CELL SYSTEM

(75) Inventors: Shoji Sekino, Tokyo (JP); Takashi Manako, Tokyo (JP); Takanori Nishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1048 days.

(21) Appl. No.: 12/282,153

(22) PCT Filed: Feb. 23, 2007

(86) PCT No.: PCT/JP2007/053387
§ 371 (c)(1),
(2), (4) Date: Sep. 19, 2008

(87) PCT Pub. No.: WO2007/105458
PCT Pub. Date: Sep. 20, 2007

(65) Prior Publication Data
US 2009/0092865 A1  Apr. 9, 2009

(30) Foreign Application Priority Data
Mar. 6, 2006 (JP) .................................. 2006-059697

(51) Int. Cl.
*H01M 8/02* (2006.01)
*H01M 8/10* (2006.01)
(52) U.S. Cl. ......... 429/414; 429/413; 429/452; 429/463
(58) Field of Classification Search ........................ None
See application file for complete search history.

(56) References Cited

U.S. PATENT DOCUMENTS

| | | | |
|---|---|---|---|
| 3,392,058 A * | 7/1968 | Harrison et al. | 429/434 |
| 2003/0180594 A1* | 9/2003 | Choi et al. | 429/32 |
| 2005/0164071 A1* | 7/2005 | Horiguchi | 429/38 |
| 2006/0134499 A1 | 6/2006 | Homma | |

FOREIGN PATENT DOCUMENTS

| | | |
|---|---|---|
| CN | 1665058 | 9/2005 |
| JP | 5-283094 | 10/1993 |
| JP | 9-213359 | 8/1997 |
| JP | 2000-164229 | 6/2000 |
| JP | 2000-331699 | 11/2000 |
| JP | 2000-331703 | 11/2000 |
| JP | 2001-6717 | 1/2001 |
| JP | 2006-32363 | 2/2006 |
| JP | 2002-319381 | 10/2002 |
| JP | 2003-36866 | 2/2003 |
| JP | 2003-282131 | 10/2003 |

(Continued)

OTHER PUBLICATIONS

US Office Action in the related U.S. Appl. No. 12/293,212 dated Apr. 5, 2011.

(Continued)

*Primary Examiner* — John S Maples
(74) *Attorney, Agent, or Firm* — Young & Thompson (57) ABSTRACT

A fuel cell system includes: a fuel cell stack configured to have a plurality of unit fuel cells arranged on an identical plane; a chassis configured to cover at least one side of said fuel cell stack via an air flow space; and a condensation water holding member configured to be provided in at least a part between said fuel cell stack and said chassis, have a mesh shape and have a function for keeping moisture.

8 Claims, 8 Drawing Sheets

FOREIGN PATENT DOCUMENTS

| | | |
|---|---|---|
| JP | 2004-14149 | 1/2004 |
| JP | 2004-185935 | 7/2004 |
| JP | 2004-241367 | 8/2004 |
| JP | 2004-288400 | 10/2004 |
| JP | 2005-32473 | 2/2005 |
| JP | 2005-108713 | 4/2005 |
| JP | 2005-129261 | 5/2005 |
| JP | 2005-183225 | 7/2005 |
| JP | 2005-322595 | 11/2005 |
| JP | 3118182 | 12/2005 |
| JP | 2006-332025 | 12/2006 |
| WO | WO 2005/45972 | 5/2005 |

OTHER PUBLICATIONS

CN Office Action—200780008186.3—Apr. 6, 2010.

* cited by examiner

| TIME | EXAMPLE 1 | EXAMPLE 2 | EXAMPLE 3 | EXAMPLE 4 | COMPARISON EXAMPLE 1 |
|---|---|---|---|---|---|
| 0.5h | 1.98V | 1.98V | 1.98V | 1.98V | 1.98V |
| 1.0h | 2.10V | 2.16V | 2.16V | 2.12V | 1.98V |
| 2.0h | 2.18V | 2.24V | 2.24V | 2.02V | 1.86V |
| 3.0h | 2.18V | 2.24V | 2.24V | 1.60V | 1.54V |

FUEL CELL SYSTEM

TECHNICAL FIELD

The present invention relates to a fuel cell system and especially relates to a planar stack type fuel cell system in which a plurality of fuel cells is arranged in plane.

BACKGROUND ART

A polymer electrolyte fuel cell system includes a Membrane and Electrode Assembly (hereinafter referred to as MEA) structured by holding and sandwiching a solid polymer electrolyte membrane between an anode and a cathode. A fuel cell in which liquid fuel is directly supplied for the anode is referred to as a direct fuel cell. When the fuel cell generates electricity, the fuel is supplied to the anode at first. The supplied fuel is decomposed on catalysts supported on the anode and generates protons, electrons, and intermediate products. Generated cations move to the cathode side after passing through the solid polymer electrolyte membrane and generated electrons move to the cathode side through an external load. Electricity is generated by a reaction where the protons and electrons react with oxygen in the air at the cathode to produce reaction products.

For example, in a direct methanol fuel cell (hereinafter referred to as a DMFC) directly using an aqueous methanol solution as the liquid fuel, a reaction shown by a following formula (chemical formula 1) is caused in an anode and a reaction shown by a following formula (chemical formula 2) is caused in a cathode.

$$CH_3OH + H_2O \rightarrow CO_2 + 6H^+ 6e^- \quad \text{(Chemical formula 1);}$$

$$6H^+ 6e^- + 3/2 O_2 \rightarrow 3H_2O \quad \text{(Chemical formula 2);}$$

Nowadays, research and development of the fuel cell system as a power source for various types of electronic devices, particularly in a mobile device, have been advanced, since the fuel cell system using the liquid fuel can easily allow reduction in size and weight. Here, in a case of using the fuel cell system as a power source of an electronic device such as a personal computer (PC), an output of the single MEA is small and a required electric voltage may not be obtained. For this reason, a plurality of unit fuel cells is electrically connected and used (hereinafter, a minimum unit in the power generation of the fuel cell system is referred to as a unit fuel cell and an aggregate of the unit fuel cells is referred to as a fuel cell stack).

The fuel cell stack is sometimes used with being stored in a chassis. In a case where the fuel cell system is stored in the chassis, moisture produced at the cathode as shown in the chemical formula 2 may be condensed in a narrow space between the chassis and the fuel cell system. When a surface of the cathode is fully covered with condensation water, the flooding which lowering the output may occur. In the unit fuel cell where the flooding has occurred, an electric current is forcibly passed under a condition where oxidant gas (the air) is not enough, resulting in destruction of the MEA. On the other hand, in a case where the MEA is dried too much, an ion conductivity is lost and thus power generation efficiency may deteriorate. Accordingly, in the fuel cell system, it is desired to provide a technique for managing the condensation water and keeping appropriate humidity.

Meanwhile, as the fuel cell system composed of the plurality of the unit fuel cells, it is known that there are a bipolar type fuel cell system stacking the plurality of the unit fuel cells in a thickness direction and a planar stack type fuel cell system arranging the plurality of the unit fuel cells in plane.

As for the management of the condensation water in the case of the bipolar type fuel cell system, several reports exist. As a technique for preventing the flooding, Japanese Laid-Open Patent Application JP-P2004-185935A discloses that a partition plate having a size sufficiently able to cover an entire gas passage is provided in a supplying manifold for distributing oxidant gas to the unit fuel cell and a drain receiver for receiving water condensed on the partition plate is provided under the partition plate.

In addition, Japanese Laid-Open Patent Application JP-P, Heisei 05-283094 discloses a fuel cell characterized in that an anode and a cathode are connected by a water passage and at least a portion of the water passage contacting to a water generation electrode is composed of materials having moisture osmosis.

In addition, Japanese Laid-Open Patent Application JP-P2005-322595A discloses that, when a supplying gas passage and an exhausting gas passage provided in a separator stacked on an electrode are not communicated with each other, a member of the separator forming an intermediate between the supplying gas passage and the exhausting gas passage is porous.

In addition, Japanese Laid-Open Patent Application JP-P2000-164229A discloses a technique for preventing a cathode from being dried. In JP-P2000-164229A, a polymer electrolyte fuel cell system characterized by including: a fuel cell stack of the polymer electrolyte fuel cell using a solid polymer membrane as an electrolyte; and temperature and humidity exchange means adapted to perform temperature exchange and humidity exchange by contacting reacted gas which passed a cell reaction portion with unreacted gas which will pass the cell reaction portion via a water-retentive porous material, wherein the polymer electrolyte fuel cell system is structured so that at least one of the oxidant gases can pass in a gas supplying path of a mesh form which is at least single-layered provided so as to contact to the porous material.

In addition, Japanese Laid-Open Patent Application JP-P2004-241367A discloses a fuel cell which includes a MEA and a separator and in which a reaction gas passage is formed on a surface of the separator facing the MEA, wherein a porous portion is formed in at least a part of the separator and a cooling gas passage is formed on a back surface of the reaction gas passage of the porous portion.

The techniques disclosed in the respective documents mentioned above relate to the bipolar type fuel cell system In a case of a device intended to be carried such as a laptop computer, the planar stack type fuel cell system is more suitable for the case as compared to the bipolar type fuel cell system due to a restriction of a thickness.

As the planar stack type fuel cell system, a system disclosed in Japanese Laid-Open Patent Application JP-P2004-14149A is given for example. That is, JP-P2004-14149A discloses a liquid fuel cell including: a positive electrode for reducing oxygen; a negative electrode having a hydrogen storage material; an electrolyte layer arranged between the positive electrode and the negative electrode, liquid fuel solving metal hydride; and a liquid fuel storage portion for storing the liquid fuel. The positive electrode, the negative electrode, and the electrolyte layer constitute an electrodes-and-electrolyte-combined assembly. A plurality of the electrodes-and-electrolyte-combined assemblies is arranged on an identical plane. Each of the electrodes-and-electrolyte-combined assemblies is electrically connected in series. The liquid fuel storage portion is separated every electrodes-and-electrolyte-combined assemblies by partition walls.

In the planar stack type fuel cell system, a plurality of unit fuel cells is arranged on an identical plane and the adjoining unit fuel cells are electrically connected by a power collector, thus a high electric voltage and an output can be obtained. When the planar stack type fuel cell system is employed, it is preferable that the entire fuel cell system is so small as to be fitted on a footprint of a portable device. For that purpose, it is required to constantly supply oxygen to the cathode in a manner, for example, that the fuel cell stack is mounted in a chassis and the air is forcibly supplied to a space between the fuel cell stack and the chassis by using a compact fan, or that a surface of the cathode is exposed to the atmosphere and the cathode is allowed naturally aspirating the air.

However, the naturally-aspirated structure in which the surface of the cathode is exposed to the atmosphere cannot generate electricity when the surface of the cathode is coated, thus it is difficult to employ a structure housing the fuel cell system itself in the portable device. In addition, even when the chassis only intended to house the fuel cell is separately installed, it is required not to close air holes provided in the chassis.

On the other hand, since electric power can be stably generated in a method for housing the fuel cell system itself in a chassis and forcibly blowing air with a compact fan unless an aspirating portion and an exhausting portion are closed, the method has an advantage to be employed as an electric power source of the portable device.

In the above-mentioned planar stack type fuel cell system which blows air with a fan, a technique for disposing of by-product materials is disclosed in Japanese Laid-Open Patent Application JP-P2005-129261A. Specifically, JP-P2005-129261A discloses that an adsorbing filter for adsorbing the by-product materials from the cell or a decomposing treatment filter for decomposing the by-product materials is provided to an exit portion of an air electrode (cathode) chamber in the planar stack type fuel cell system.

However, all the documents mentioned above do not disclose the method for managing the condensation water in the planar stack type fuel cell system.

DISCLOSURE OF INVENTION

In consideration of usage for a portable device, the planer stack type fuel cell system is more suitable than the bipolar type fuel cell system as described above. When a structure where a fuel cell stack of the planer stack type fuel cell system is housed in a chassis and oxidant gas is forcibly fed to a cathode by a fan or the like, it is preferable that a distance between a cathode electrode of an unit fuel cell and an inside surface of the chassis facing the cathode electrode is as short as possible from a viewpoint of the requirement for reducing a thickness.

On the other hand, from a viewpoint of an air supply, it is suitable to have a larger clearance between the fuel cell stack and the chassis, that is, a larger space over the cathode for a stable air supply. In addition, when electric power consumption becomes large, a heat amount also becomes large. Accordingly, when a structure where the separator is provided on the cathode and a part of the space over the cathode is separated is employed, the structure has disadvantages in the air supply and the heat radiation.

Consequently, it is preferable that the distance between the fuel cell stack and the chassis is as short as possible and the structure where the space over the cathode, that is, an air flow space provided on one surface of the fuel cell stack (a surface including a surface of the cathode) is not separated in a planar direction. In the fuel cell system having such structure, the air is supplied to the cathode by forming a unidirectional air flow in the air flow space.

However, in the fuel cell system consuming large electric power, the air flowing in the air flow space have to pass on many unit fuel cells from an aspirating portion to an exhausting portion. As a result, a side near the aspirating portion (an upper stream side) is constantly exposed to the fresh air and is in relatively low humidity and low temperature, while a side near the exhausting portion (an lower stream side) tends to be in relatively high humidity and high temperature since heat and moisture generated from many cathodes are fed. In such situation, a portion where a power generation environment is in low temperature and low humidity and a portion where a power generation environment is in high temperature and high humidity exist together in an identical fuel cell stack, thus it becomes difficult to perform the stable power generation.

On the lower stream side in high temperature and high humidity, moisture is easily condensed and flooding is concerned. In contrast, on the upper stream side in low temperature and low humidity, decrease of the ion conductivity because of drying is concerned. This is because an output of the MEA drops under the situation where the water content of the MEA is small although the proton conduction in an electrolyte membrane and a catalyst layer plays an important role in the power generation of the MEA and the proton conduction requires water. If the power generation is continued under this situation, an electric current is forcibly passed and thus the MEA is deteriorated.

Therefore, it is desired to increase the humidity on the cathode surface in the unit fuel cell in the upper stream portion of the air flow and to homogenize the humidity environment of a plurality of the unit fuel cells as much as possible in some form. However, in the planar stack type fuel cell system considered to be used for a portable device, it is difficult to solve the two problems of the flooding and drying of the cathodes at a time. Introducing of a humidity regulation mechanism such as a humidification mechanism into the portable device cannot be an essential solution for measures of the condensation water because of the restriction of a space.

The present invention is proposed in order to solve the above-mentioned problems. That is, an object of the present invention is to provide a fuel cell system suppressing the flooding in which the condensation water interferes the power generation, in the fuel cell system having a plurality of unit fuel cells such as the planar stack type fuel cell system.

Another object of the present invention is to provide a fuel cell system solving the shortage of humidity on the unit fuel cell and homogenizing temperature and humidity environment among a plurality of the unit fuel cells.

Further another object of the present invention is to provide a fuel cell system suppressing the flooding and solving the shortage of humidity after achieving reduction of the space required by the portable device.

The fuel cell system according to the present invention includes: a fuel cell stack configured to have a plurality of unit fuel cells arranged on an identical plane; a chassis configured to cover at least one side of the fuel cell stack via an air flow space; and a condensation water holding member configured to be provided in at least a part between the fuel cell stack and the chassis, have a mesh shape and has a function for keeping moisture.

According to the above described configuration, moisture generated in the fuel cell is kept in the part between the fuel cell stack and the chassis by the condensation water holding member even when condensed. Since the moisture is trapped by the condensation water holding member not on the fuel cell, the flooding is solved. In addition, since the condensation water holding member has the mesh shape, the trapped water spreads from a portion with high humidity to a portion with low humidity with percolating in the condensation water holding member. Accordingly, it is possible to humidify a portion easily becoming in low humidity and to homogenize humidity in the air flow space over the unit fuel cell.

In addition, the condensation water holding member may preferably be 40 to 200 mesh in this case. When the mesh is smaller than 40 mesh, the condensation water sometimes drops to the side of the unit fuel cells. On the other hand, when the mesh is larger than 200 mesh, it sometimes becomes difficult for the moisture to be condensed on the chassis side.

Moreover, the condensation water holding member may preferably have the mesh shape woven in a grid shape, and weft yarns and warp yarns in the grid of the condensation water holding member may be preferably woven so as to be arranged in a parallel direction and a vertical direction to a direction where the oxidant gas flows, respectively.

In addition, the condensation water holding member may be preferably made of metal. When the condensation water holding member is made of metals, a part between the condensation water holding member and the chassis easily becomes in low temperature with respect to the heating unit fuel cells. The moisture generated in the unit fuel cells is easily condensed on the side of the chassis with lower temperature more than on the side of the unit fuel cells, and the occurrence of the flooding can be reduced more certainly. Furthermore, in the fuel cell stack, the heat is easily conducted to the portion easily becoming in low temperature and temperature distribution in the fuel cell stack is homogenized.

In addition, on another aspect, the condensation water holding member may be preferably made of polymer.

In addition, in the above described fuel cell system, a portion corresponding to a position of the condensation water holding member in the chassis may be preferably made of metal. When the chassis is made of metal, the chassis side easily becomes in low temperature with respect to the heating unit fuel cell side. The moisture generated in the unit fuel cells is easily condensed on the chassis side. Here, since the condensation water holding member is provided at the position corresponding to the metal portion, the moisture condensed on the chassis side is kept by the condensation water holding member more certainly. Consequently, the occurrence of the flooding is reduced more certainly. Furthermore, in the fuel cell stack, the heat is easily conducted to the portion easily becoming in low temperature and thus temperature distribution in the fuel cell stack is homogenized.

Moreover, the condensation water holding member may be preferably attached to an entire surface inside the chassis facing one surface of the fuel cell stack. When the condensation water holding member is attached to the entire surface inside the chassis, the moisture trapped by the condensation water holding member can move to all directions in the planar direction. Since spreading of the moisture is not prevented, the flooding is suppressed more certainly.

In the fuel cell system according to the present invention, oxidant gas may flow in one direction in the air flow space. The condensation water holding member may be preferably shared by unit fuel cells adjoining in a direction where the oxidant gas flows, and be preferably separated for unit fuel cells adjoining in the direction vertical to the direction where the oxidant gas flows.

As described above, when the condensation water holding member is not separated in the direction parallel to the flow of the oxidant gas and is separated in the vertical direction, the trapped moisture becomes easy to selectively spread to the flow direction of the oxidant gas. Thus, the moisture trapped on the lower stream side easily condensing the moisture easily spreads to the upper stream side easily drying. Accordingly, the humidity of the fuel cells on the upper stream side is kept. The humidity environment of the fuel cell stack is homogenized more.

In the above described fuel cell system, at least a part of the condensation water holding member may be preferably bared to outside.

According to the present invention, in the fuel cell system having the plurality of the unit fuel cells such as the planar stack type fuel cells, the fuel cell system is provided, which suppresses the flooding in which the condensation water interferes the power generation.

According to the present invention, the fuel cell system is further provided, which solves the shortage of humidity in the unit fuel cells and which homogenizes the temperature and humidity environment among the plurality of the unit fuel cells.

According to the present invention, the fuel cell system is further provided, which suppresses the flooding and solves the shortage of humidity after achieving reduction of the space required by the portable device.

BEST MODE FOR CARRYING OUT THE INVENTION

A fuel cell system 1 according to the present invention will be explained. The fuel cell system 1 includes a fuel cell stack 15, a chassis 14 housing the fuel cell stack 15, a blower for supplying the air (oxidant gas), a fuel mother tank for storing fuel, a pump for flowing the fuel, and wirings for extracting electric energy. A mesh 71 is adhered to an inside of the chassis 14 as a condensation water holding member for temporarily holding condensation water. Meanwhile, the blower, the fuel mother tank, the pump, the wirings are not shown in the attached drawings. When the fuel cell system is used for a portable device such as PC consuming relatively large electric power, the fuel cell stack 15 may obtain a required electric voltage and an output not only by using a single fuel cell stack but also by arranging two or more fuel cell stacks 15 and electrically connecting them. When the fuel cell system 11 is mounted on the portable device, the fuel cell stack 15 is housed in the chassis 14.

Figure 1:
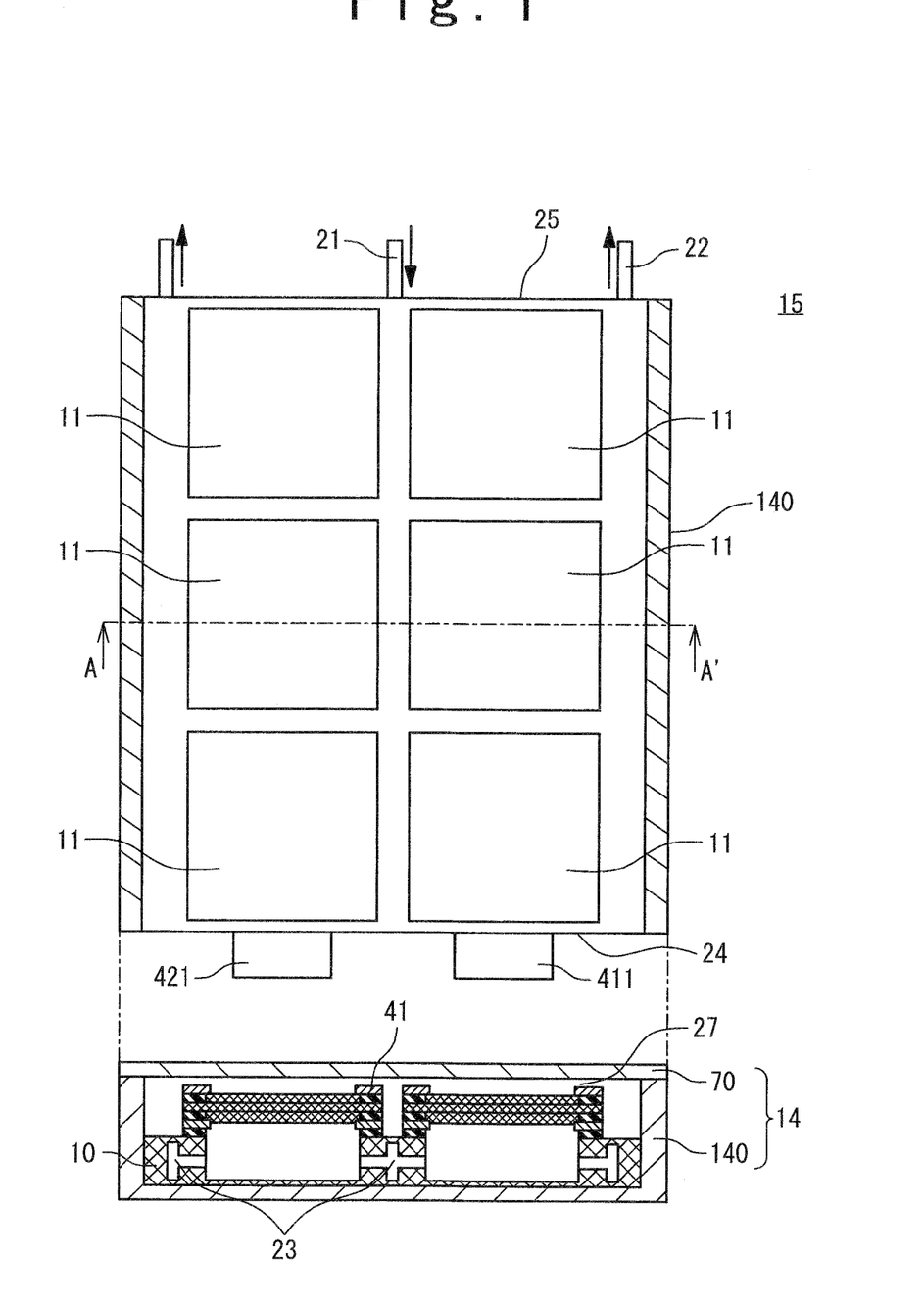
FIG. 1 is a top view and a cross sectional view along AA' of a fuel cell stack.

Referring to FIG. 1, a structure in a state where the fuel cell stack 15 is housed in the chassis 14 will be explained below. Here, to make the explanation easily understandable, the condensation water holding member (a mesh 71) that is ingenuity in the present exemplary embodiment is not shown in FIG. 1.

FIG. 1 is a top view and a cross sectional view showing a configuration of the fuel cell stack 15 housed in the chassis 14. Meanwhile, in the top view of FIG. 1, components such as the fuel cells 11 are covered with the chassis 14 and cannot be seen actually, however, they are shown through the chassis 14 for convenience of the explanation.

As shown in the cross sectional view in FIG. 1, the chassis 14 includes a chassis body 140 and a lid 70. The chassis body 140 has a rectangular base and side surfaces upwardly standing from two facing sides of the base. That is, the chassis body 140 has a rectangular solid shape, which opens a top surface and two side surfaces facing each other among four side surfaces (two side surfaces positioning in a vertical direction of the paper in the cross sectional view in FIG. 1).

The lid 70 has a shape (a rectangular shape) corresponding to the opening portion of the top surface, and is put on and cover the top surface in a state where the fuel cell stack 15 is housed in the chassis body 140. Here, a space (reference letter is 27) is slightly formed between the fuel cell stack 15 and the lid 70. This space is for supplying oxidant gas (the air) to a cathode, and is described as an air flow space 27 hereinafter. The air flow space 27 is provided over the entire fuel cell stack 15. That is, the air flow space 27 continues above a plurality of the unit fuel cells 11 without being divided by a partition or the like.

The two opened side surfaces are respectively a stack aspiration opening portion 24 for supplying the air to the air flow space 27 and a stack exhaust opening portion 25 for exhausting the air from the air flow space 27.

The fuel cell stack 15 includes the plurality (six in the present exemplary embodiment) of the unit fuel cells 11. The plurality of the unit fuel cells 11 are arranged on an identical plane. All the unit fuel cells 11 are arranged with the cathode 31 upward, although a structure of the unit fuel cell 11 will be described later. A frame-shaped cathode power collector 41 is provided on the cathode 31 of the respective unit fuel cells 11. A central portion of a top surface of the cathode 31 contacts to the air flow space 27, and thereby the air flowing in the air flow space 27 is supplied to the cathode 31 as oxidant gas.

In the fuel cell system 1 having the above-mentioned configuration, the air is supplied into the air flow space 27 from the stack aspiration opening portion 24 by blowing means which is not shown in the figure. The air supplied into the air flow space 27 passes on the cathodes 31 of the respective unit fuel cells 11 and is exhausted from the stack exhaust opening portion 25 to outside. When flowing in the air flow space 27, the air is also supplied to the cathode 31 of the respective unit fuel cells 11 as the oxidant gas.

As the blowing means, a sirocco fan, an axial flow fan, a cross-flow fan, and a turbo fan are given for example, but the blowing means is not limited to these fans. Considering a case of mounting the fuel cell system to the portable device, the fan such as a small centrifugal fan consuming low electric power is preferable.

As for the blowing means using the fan, two methods can be mainly considered. In one method, the fan is arranged on the stack aspiration opening portion 24 side and blows the air to the fuel cell stack 15 in a positive pressure. In the other method, the fan is arranged on the stack exhaust opening portion 25 side and blows the air to the fuel cell stack 15 in a negative pressure. When a size of the fuel cell system is not restricted, since the fan can be arranged with being kept away from the fuel cell stack, there is no great difference between both of the arrangements. However, in order to blow the air to the fuel cell stack 15 in the positive pressure, the fan as the blowing means has to be arranged away from the fuel cell stack 15, or the fan is required which has a size able to blow the air equally to an opening portion of the stack aspiration opening portion 24. In that case, since downsizing of the fuel cell system is restricted, it is preferable to blow the air in a negative pressure when the fuel cell system is used for a portable device having a limited sized.

In addition, the fan is not necessarily arranged on a surface identical with the fuel cell stack 15. For example, in a case where there is a restriction to a footprint but there is not a restriction in a vertical direction, the electric power can be generated by: arranging the fan at an upper part or a lower part of the fuel cell stack 15; and blowing the air into the air flow space 27 by connecting the stack aspiration opening portion 24 or the stack exhaust opening portion 25 to an exhaust opening or aspiration opening of the fan with arc-shaped air guides. In this case, an straightening effect in the air guides can be improved by attaching the mesh inside the air guides. Here, the method describing the blowing method is one example, which does not limit the blowing method.

Subsequently, referring to FIG. 2, the mesh 71 (the condensation water holding member) that is an ingenuity part in the present exemplary embodiment will be explained. The condensation water holding member has a function for keeping moisture. The mesh 71 is adhered on allover surface inside the lid 70. As shown in a cross sectional view in FIG. 2, the lid 70 is placed on the chassis body 140 via the mesh 71. Accordingly, the chassis 14 is not arranged at side portions of the mesh 71 and is bared to outside. By providing the mesh 71 in this manner, effects mentioned below can be realized.

In generating electric power, an amount of moisture included in the air is larger at a down stream side (the stack exhaust opening portion 25) in the air flow space 27. This is because cathode product water produced by the power generation reaction at the unit fuel cells 11 on an upper stream side is carried to a lower stream side by the air flow. For this reason, the moisture easily condenses at a lower stream portion, that is, on the unit fuel cells 11 positioned on an area near the stack exhaust opening portion 25. When the condensation occurs, a water column is formed between the lid 70 and the cathode 31, and when the condensation progresses, the flooding may occur. When the power generation is continued with leaving the flooding, not only voltage drop of the unit fuel cells 11 but also a risk of a short circuit via the water between the adjoining unit fuel cells 11 arise.

In addition, when the system is used for the portable device, it is preferable due to a demand for miniaturization that a distance between the lid 70 and the fuel cell stack 15 is as small as possible. However, when the distance between the lid 70 and the fuel cell stack 15 is reduced, a flow of the air flowing in the air flow space 27 is blocked by slight condensation water. Upon blocking of the flow of the air, the air of an adequate amount is not supplied to the cathode 31 and the power generation efficiency deteriorates.

On the other hand, the mesh 71 is provided in the present exemplary embodiment, and thus even when the cathode product water turns into water droplets on the surface of the cathode 31, the water droplets are absorbed and kept in the mesh 71. Accordingly, the flooding affecting the power generation can be prevented. In addition, the condensation water inside the chassis 14 spreads between the mesh 71 and the lid 70 along a planar direction because of the capillary phenomenon. Thereby, it can be prevented that the condensation water blocks the flow of the air in the air flow space 27. As a result, a space (corresponding to a thickness of the air flow space 27) above the upper surface of the cathode can be narrowed more, thus the fuel cell system 1 can be downsized more.

Since side parts of the mesh 71 are bared to outside, the condensation water kept by the mesh 71 is released from the side parts of the mesh 71 to the outside. Consequently, humidity in the air flow space 27 is prevented from unnecessarily increasing.

The moisture is easily condensed on the down stream side of the air flow space 27, while the upper stream side is easy to dry since dry air is constantly fed to the upper stream side. When the unit fuel cells 11 dry, the ion conductivity is lost and an adequate electromotive force cannot be obtained.

In the present exemplary embodiment, by attaching the mesh 71 inside the lid 70, the water kept on the down stream side spreads to the upper stream side with being kept by the mesh 71. Accordingly, the upper stream side is humidified by the moisture fed from the down stream side and the lost of the ion conductivity can be avoided.

Figure 3:
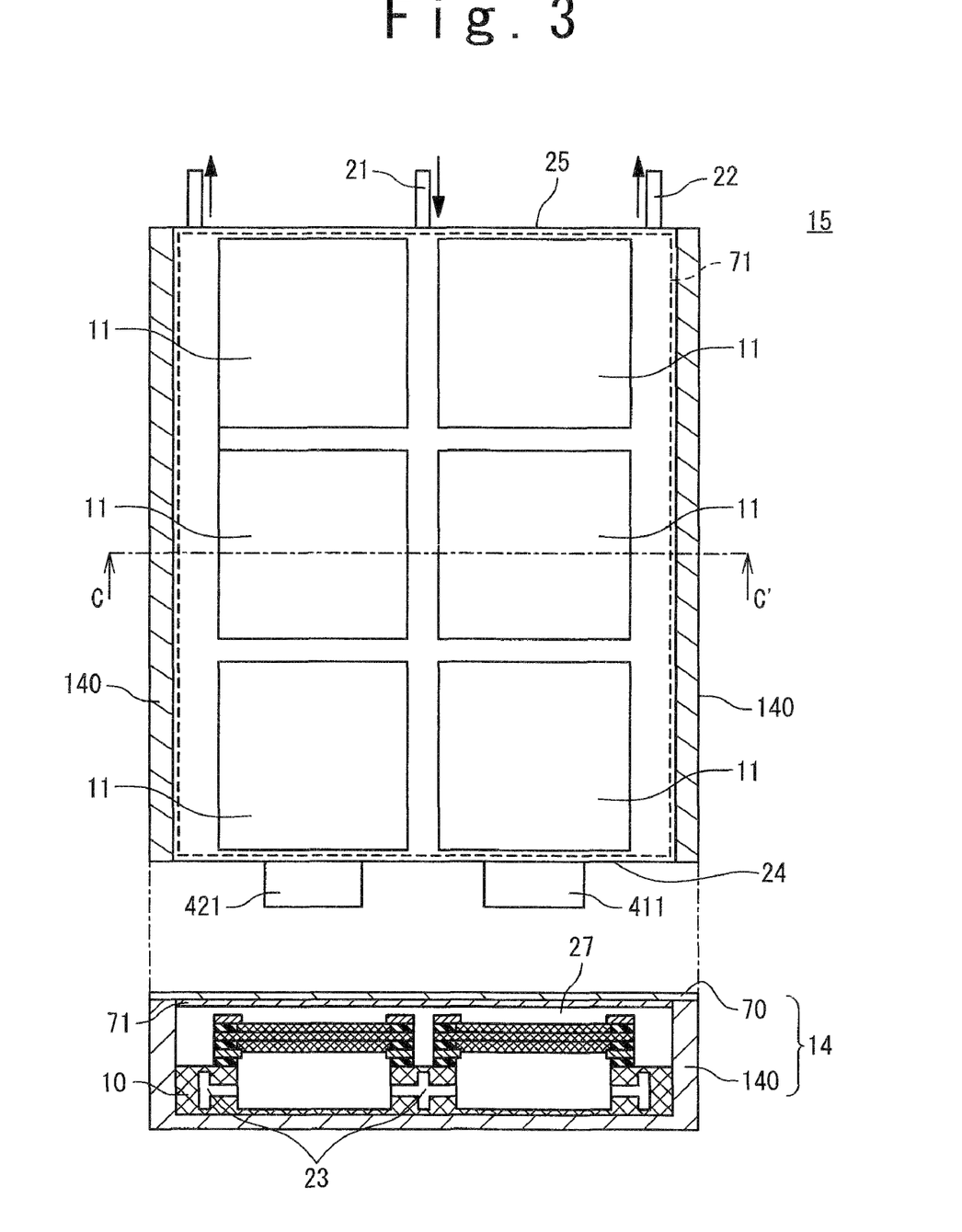
FIG. 3 is a top view and a cross sectional view along CC' showing an appearance of a state where a fuel cell stack of the present invention is housed in a chassis.
Figure 4:
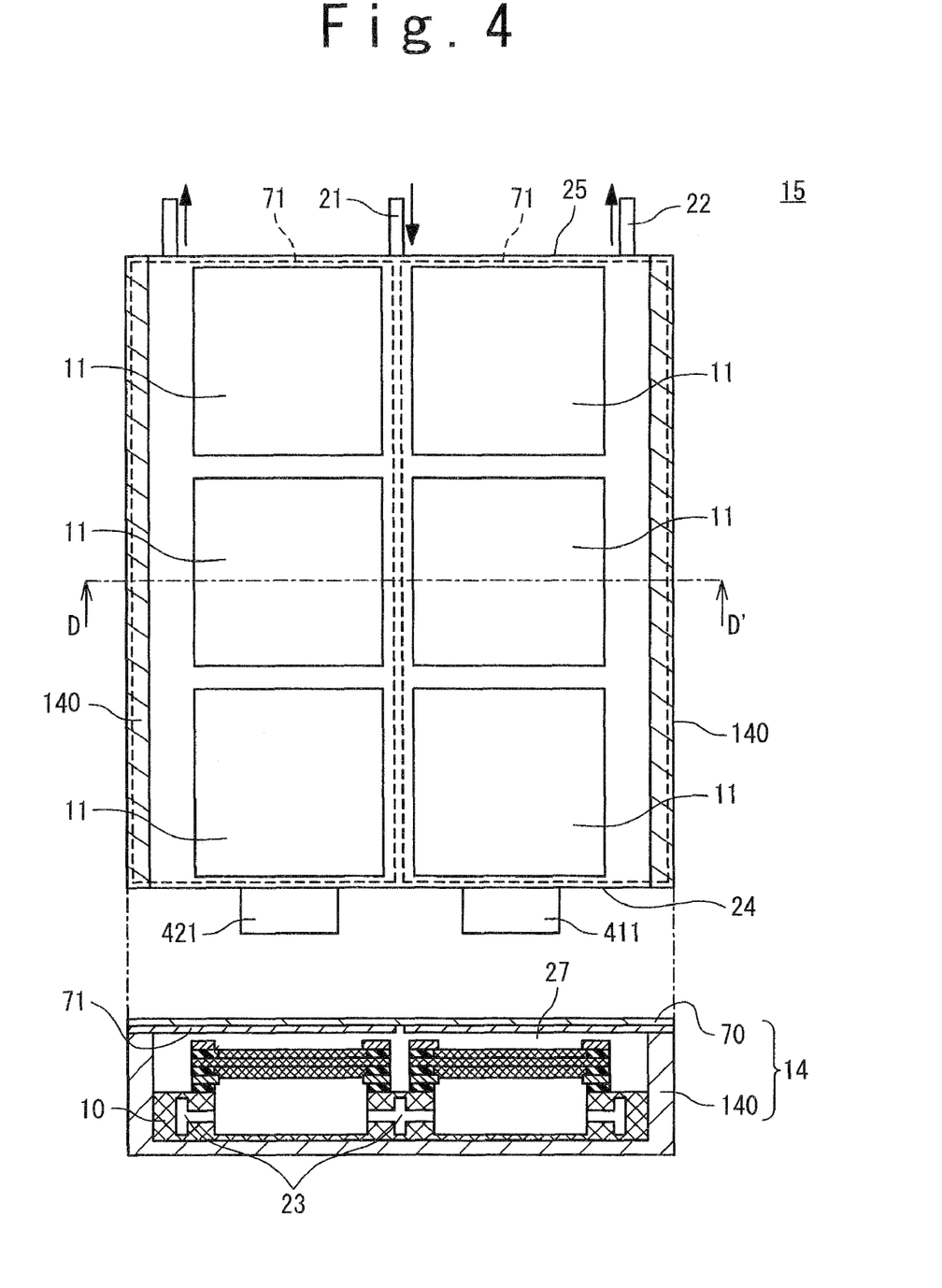
FIG. 4 is a top view and a cross sectional view along DD' showing an appearance of a state where a fuel cell stack of the present invention is housed in a chassis.

Moreover, the mesh 71 may be arranged as FIG. 3 or FIG. 4. In an example shown in FIG. 3, the mesh 71 is arranged so as to be embedded in the opening portion of a top surface of the chassis body 140. Specifically, the side portions of the mesh 71 contact to an inside of the side surfaces of the chassis body 140 and is not bared to the outside as shown in FIG. 2. Thus, the moisture trapped by the mesh 71 continues to be kept without exhaust to the outside. Thereby, the condensation water spreads more easily and a humidification effect can be improved more.

In addition, in an example shown in FIG. 4, the mesh 71 is divided into two along a flow direction of the air flow (a direction from the stack aspiration opening portion 24 to the stack exhaust opening portion 25). The mesh 71 is discontinuous between the unit fuel cells 11 adjoining in a direction orthogonal to the flow direction of the air flow. By dividing the mesh 71 along the direction of the air flow as described above, the water condensed and kept on the down stream side selectively spreads to a direction along the direction of the air flow. That is, the water condensed and kept on the down stream side selectively spreads to the upper stream side and the humidification effect on the upper stream side can be improved more.

Figure 2:
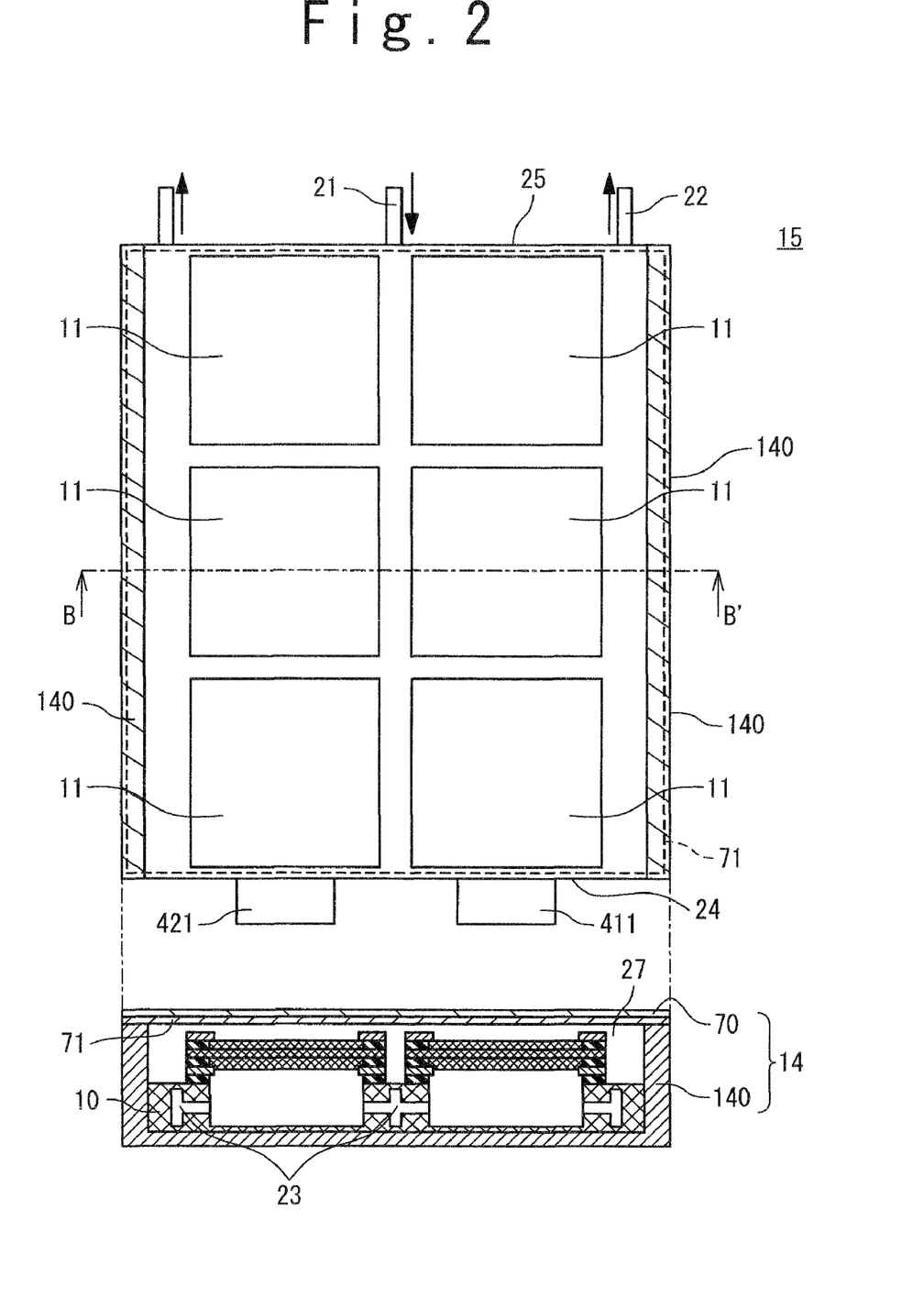
FIG. 2 is a top view and a cross sectional view along BB' showing an appearance of a state where a fuel cell stack is housed in a chassis.

As described above, a suitable function can be realized depending on the intended use by considering a shape of the mesh 71 as shown in FIGS. 2 to 4. In addition, the structures of FIGS. 2 and 3 may be combined. When the side portions of the mesh 71 is bared to the outside on the lower stream side as shown in FIG. 2 and the mesh 71 is covered with the chassis on the upper stream side as shown in FIG. 3 for example, it is possible to obtain the humidification effect without loosing the condensation water on the easily dried upper stream side and to release surplus water from the side portions of the mesh 71 to the outside on the lower stream side easily causing the flooding.

Subsequently, materials of the mesh 71 will be explained. As the materials of the mesh, anticorrosive metals such as stainless-steel, plastics (polymeric materials) such as polyethylene, polypropylene, PTFE (polytetrafluoroethylene), and insulating materials such as paper can be given.

Among such materials, from viewpoints of homogenization of temperature, the metallic materials with high thermal conductivity are preferable. Since the fuel cell stack 15 generates heat in the power generation process, temperature of the fuel cell stack 15 rises. The unit fuel cells 11 are exposed to the fresh air with relatively low temperature from the outside to be cooled on the upper stream side, and the unit fuel cells 11 on the lower stream side are not cooled as much as those on the upper stream side since the air warmed at the upper stream side is supplied to the lower stream side. Accordingly, a temperature difference between the unit fuel cells 11 on the upper stream side and those on the lower stream side is produced. When the mesh 71 is made of metal, the heat is conducted from the unit fuel cells 11 on the lower stream side to those on the upper stream side. Thus, the temperature between the unit fuel cells 11 on the lower stream side and those on the upper stream side is homogenized.

In addition, when the mesh 71 is made of metal, the thermal conductivity of the mesh 71 becomes high. Therefore, the heat is releases on the mesh 71 side, and thus the mesh 71 side tends to be in low temperature as compared to the unit fuel cells 11 side (the cathode 31 side). Consequently, the moisture tends to be condensed (the mesh 71 side) on the lid 70 side as compared to the unit fuel cells 11 side, and the mesh 71 traps the moisture more easily. That is, the moisture in the air flow space 27 can be easily condensed by the mesh 71 made of metal and easily trapped by the mesh 71.

On the other hand, from the viewpoint of the insulation property, it is preferable for the mesh 71 to be made of plastic. Since the mesh 71 covers the adjoining unit fuel cells 11 with striding over them over the cathode 31, there is a risk of the short circuit due to electric conductance through the condensation water when the mesh 71 has conductivity. The paper can be used as the insulating materials for example. However, if the materials easily deform because of moisture, the entire mash may droop on the surface of the cathode 31. Thus, the plastic is superior to the paper in terms of small deformation at the water absorption.

The mesh 71 has been explained as the condensation water holding member in the above-mentioned example. However, absorbent materials such as foamed metals and urethane materials can be used as the condensation water holding member. In a case of the materials with high water absorbability such as paper and cloths, the water tends to locally accumulate than spread. Accordingly, it is not so suitable for usage considering stability for long time. However, if in a state able to be replaced frequently, the materials also can be used as the condensation water holding member.

Moreover, as a mesh shape of the mesh 71, for example, a lattice-shaped mesh woven by straight narrow wires are given. In addition, a mesh made by entwining non-straight fibers also can be used. However, it is preferable to use a mesh woven in a grid shape for the purpose of temporarily holding the condensation water between the lid 70 and the mesh 71. Further, it is preferable that warp wires and weft wires of the grid are arranged so as to be respectively parallel and vertical with the air flow. It is preferable for the mesh 71 to be within a range from 40 to 200 mesh.

Subsequently, a shape and a material of the lid 70 will be explained. An internal surface of the lid 70 (a surface facing the air flow space 27) is preferably smooth so as not to block the air flow.

In addition, the lid 70 is preferably formed by using a material with high thermal conductivity such as metal material as a base material. As such materials, metals such as stainless-steel and aluminum are given. Furthermore, for the purpose of avoiding the short circuit between the adjoining unit fuel cells 11, a lid may be used which is formed by using the metal material as the base material covered with an insulating sheet such as a plastic sheet.

A temperature distribution among the plurality of the unit fuel cells 11 can be homogenized by using the materials with high thermal conductivity as the lid 70. By using the materials with high thermal conductivity as the lid 70, heat at the lower stream side is conducted to the upper stream side and the temperature distribution of the fuel cell stack 15 is homogenized. Since temperature at the power generation process is homogenized, the power generation of the fuel cell stack 15 can be stabilized more.

Moreover, since the lid 70 is formed of the material with high thermal conductivity, heat of the lid 70 is radiated also to the outside. Because the lid 70 is cooled by the heat radiation, the lid can easily be in a lower temperature than the cathode 31. This causes a temperature difference between the heat-generating cathode 13 and the heat-radiating lid 70. When the moisture is condensed, the moisture tends to be condensed on the lid 70 side as the low temperature side and is hard to be condensed on the cathode 31 side. Consequently, the condensation water is easily kept by the mesh 71, thus the flooding is certainly avoided.

It is preferable for the mesh 71 to be attached to the lid 70 via a slight clearance. When the mesh 71 is attached by using an adhesive tape such as an adhesion bond and a double-stick tape for not the whole surface but a part of the surface, a clearance equal to a thickness of the adhesive tape is formed between the mesh 71 and the lid 70. This allows the condensation water to be kept in the clearance part and to spread in the planar direction. On this occasion, if the adhesive portion is formed to be parallel to the flow direction of the air flow, the adhesive portion is preferably prevented from blocking the airflow.

Figure 5:
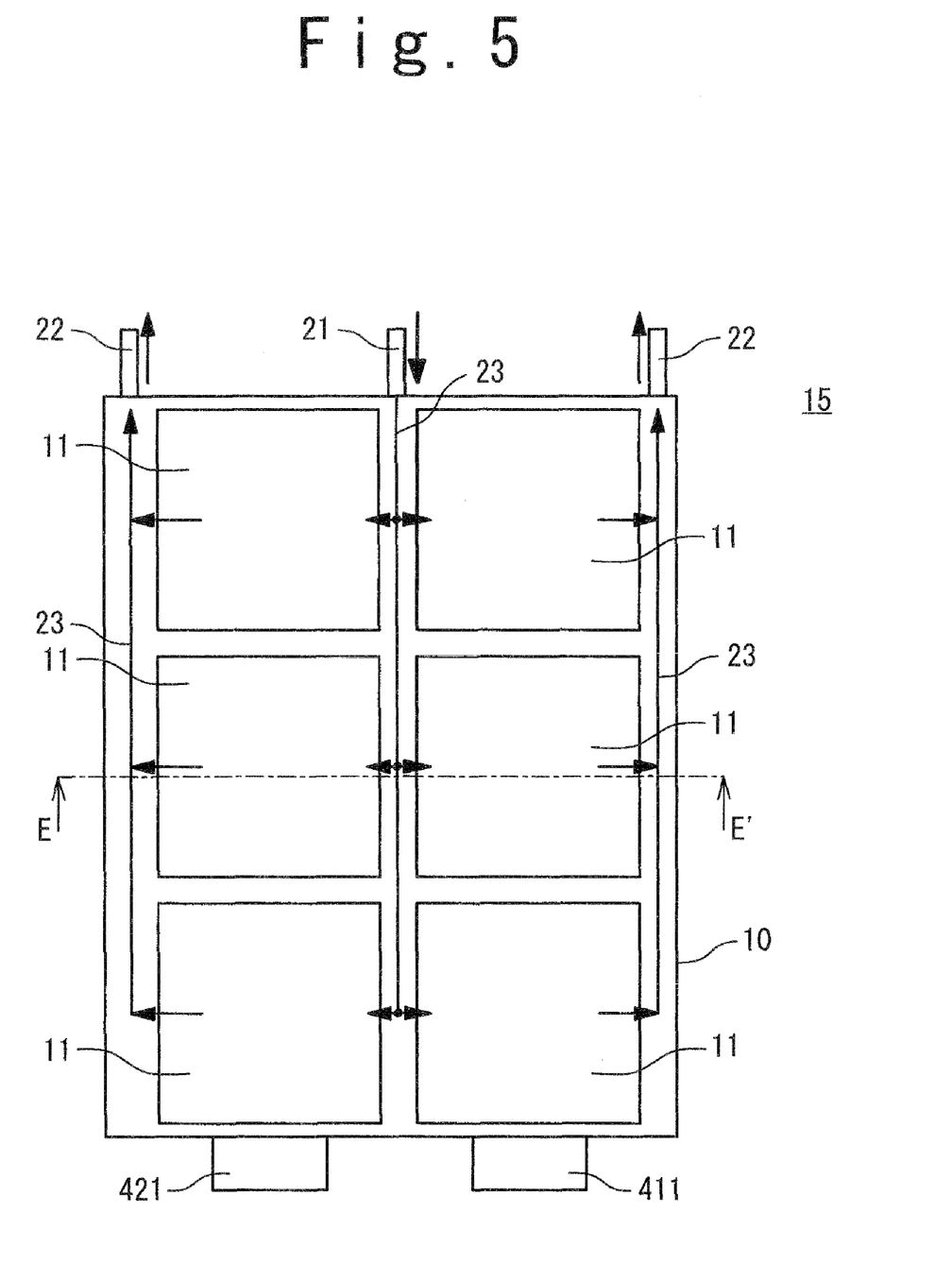
FIG. 5 is a top view of a fuel cell stack.
Figure 6:
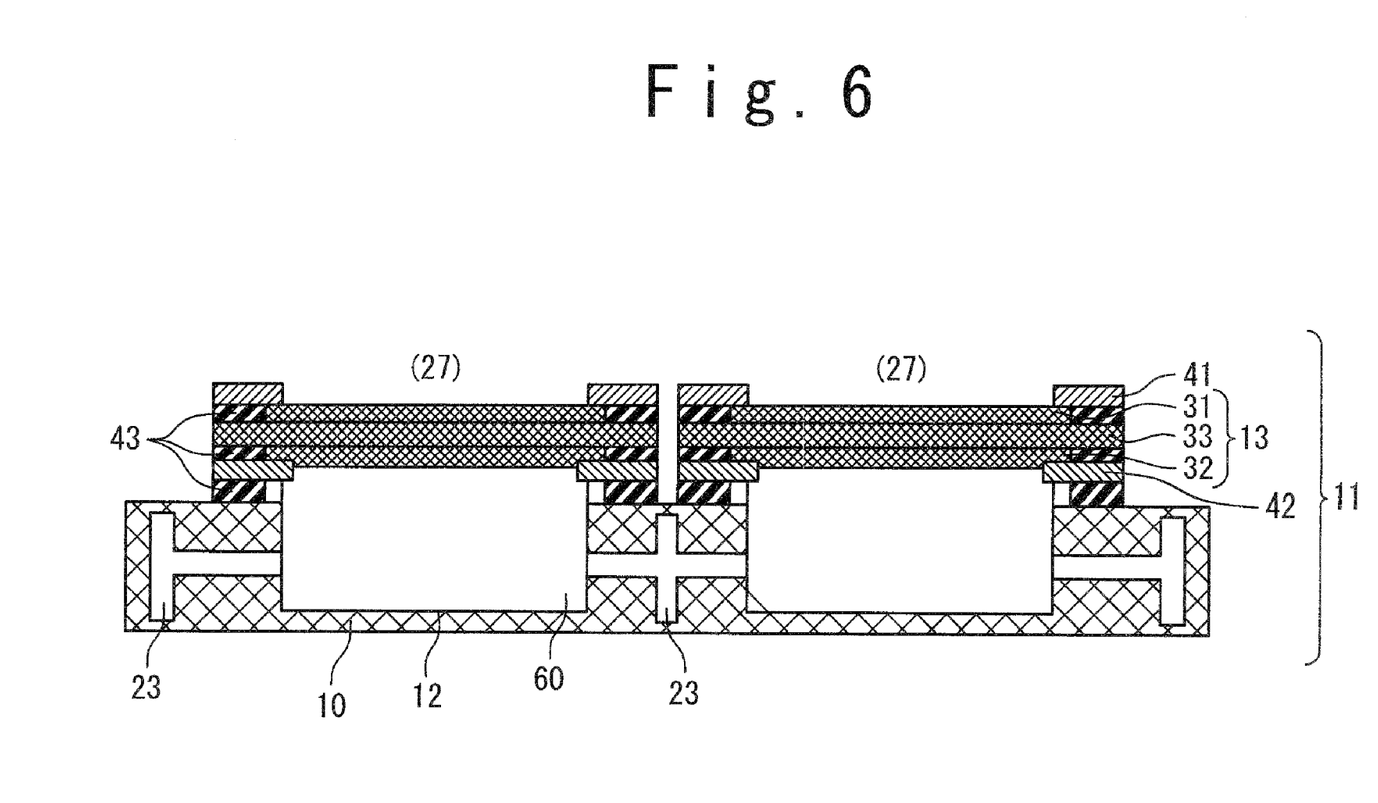
FIG. 6 is a cross sectional view of a fuel cell stack along EE' in FIG. 5.

Subsequently, the unit fuel cells 11 and a fuel supplying path will be explained referring to FIGS. 5 and 6. FIGS. 5 and 6 are schematic diagrams showing an example of the fuel cell stack 15. FIG. 5 is a view seen from a top surface (a top view) and FIG. 6 is a cross sectional view along EE' of FIG. 5. In the cross sectional view of FIG. 6, details of respective members is drawn. Arrowed lines in FIG. 5 show directions in which the fuel flows.

As shown in FIG. 5, the fuel cell stack 15 includes the plurality of the unit fuel cells 11 (six unit fuel cells shown in the figure). The plurality of the unit fuel cells 11 are arranged in a matrix of 2 columns×3 rows on a frame 10. Here, all of the unit fuel cells 11 are arranged with the cathode 31 side upward. In addition, the plurality of the unit fuel cells 11 are electrically connected each other via wirings not shown in the figure. The electric power generated by the respective unit fuel cells 11 is extracted to the outside of the fuel cell stack 15 via electric power extracting terminals 411 and 421.

One stack fuel inlet 21, two stack fuel outlets 22, and fuel paths 23 are provided to the frame 10. The stack fuel inlet 21 is connected to the respective unit fuel cells 11 by the fuel paths 23. In addition, the each unit fuel cell 11 is connected to any one of the two stack fuel outlets 22 via the fuel path 23 for exhaust.

Fuel supplied to the respective unit fuel cells 11 is introduced from the fuel mother tank (not shown in the figure) into the frame 10 via the stack fuel inlet 21. The fuel introduced from the stack fuel inlet 21 is supplied to the respective unit fuel cells 11 with branching via the central fuel paths 23 and is consumed. The fuel which is not consumed by the unit fuel cells 11 is discharged to the fuel paths 23 provided on both sides and is returned to the fuel mother tank via the stack fuel outlets 22 with subsequently converging.

Meanwhile, the supplying method of the liquid fuel is not limited to this method, the supplying method may employ a structure where, for example, the fuel paths connect the respective unit fuel cells 11 so that the fuel can directly flows into, and its configuration is not necessarily limited to the structure shown in the explanatory description.

Referring to FIG. 6, a structure of the unit fuel cells 11 will be explained. FIG. 6 shows an example of direct methanol unit fuel cells that are unit fuel cells in which the liquid fuel directly supplies to the unit fuel cells 11. In the present exemplary embodiment described below, a direct liquid system directly supplying the liquid fuel to the anode will be explained as an example. However, the system is just an example and the present invention is not limited to methods and structures described below. For example, the fuel may be supplied after evaporating via a vapor-liquid separation membrane such as a PTFE.

As shown in FIG. 6, the each unit fuel cell 11 includes a solid polymer electrolyte membrane 33, the cathode 31, the anode 32, the cathode power collector 41, an anode power collector 42, the fuel tank part 12, and seal members 43. The MEA 13 is formed of the solid polymer electrolyte membrane 33, the cathode 31, and the anode 32.

The fuel tank part 12 is a concave portion provided to the frame 10. An inlet for taking in the fuel and an outlet for discharging the fuel are provided to the fuel tank part 12. The inlet and the outlet are connected to the fuel paths 23, respectively. Accordingly, the fuel supplied from the stack fuel inlet 21 is stored in the fuel tank part 12 via the fuel paths 23. In addition, the surplus fuel in the fuel tank part 12 is delivered to the stack fuel outlet 22 via the fuel paths 23.

A fuel holding material so-called a wicking member 60 is inserted inside the fuel tank part 12. The wicking member 60 is arranged for the purposes of absorbing and holding the fuel (aqueous methanol solution) mainly by the capillary phenomenon and of stably supplying the fuel to the MEA. A part of the liquid fuel supplied to the fuel tank part 12 is temporarily absorbed by the wicking member 60, however, most of the liquid fuel is supplied to the anode 32 of the MEA 13 and consumed for a reaction in the power generation. The fuel which is not consumed despite supplied to the fuel tank part 12 returns to a fuel container again and is temporarily absorbed by the wicking member 60. However, when the fuel holds a concentration at which the unit fuel cells 11 placed at a position corresponding to the lower stream portion of the fuel paths can also sufficiently generate the electricity and the fuel will not be supplied uncertainly, the wicking member 60 is not necessarily an essential component and may be abbreviated.

The MEA 13 is arranged so as to cover the upper portion of the fuel tank part 12. The cathode 31 is arranged on one surface of the solid polymer electrolyte membrane 33 with contacting to the surface, and the anode 32 is arranged on the other surface of the solid polymer electrolyte membrane 33 with contacting to the surface. Specifically, the MEA 13 is composed of the solid polymer electrolyte membrane 33, the anode 32 and the cathode 31, in which the anode 32 and the cathode 31 sandwich and hold the solid polymer electrolyte membrane 33. The MEA 13 is arranged so that the anode 32 can be set on the fuel tank part 12 side and that the fuel introduced into the fuel tank part 12 can be supplied to the anode 32.

On the other hand, there is the space (the air flow space 27) above an upper side of the cathode 31. As described above, the oxidant gas (the air) is supplied to the cathode 31 from the air flow space 27.

As described above, the liquid fuel is supplied to the anode 31 from the fuel tank part 12, the air is supplied to the cathode 31 from the air flow space 27, and thus the MEA 13 generates the electricity.

The anode power collector 42 and the cathode power collector 41 are for collecting the electric power generated by the each MEA 13 and extracting the power. The anode power collector 42 and the cathode power collector 41 are arranged on a lower side and an upper side of the MEA 13. The anode power collector 42 and the cathode power collector 41 are frame-shaped and arranged so as to sandwich periphery portions of the anode 32 and the cathode 31 from below and above.

The seal members 43 are arranged in order to seal clearances produced among the MEA 13, the anode power collector 42, and the cathode power collector 41 and to avoid a fuel leakage to the outside. In the present exemplary embodiment, the seal members 43 are frame-shaped and arranged on periphery parts of the power collectors.

The unit fuel cells 11 composed as described above are secured to the frame 10 by a plurality of screws (not shown in the figure) so as to penetrate the peripheral portions. Meanwhile, the means adapted to secure the unit fuel cells 11 to the frame 10 is not limited to the screws and may be a technique using an adhesive, and may have a structure where the liquid fuel does not leak from the unit fuel cells 11.

Subsequently, materials of the respective components constituting the unit fuel cells 11 will be explained.

A polymer membrane with high proton conductivity and without the electron conductivity is preferably used as the solid polymer electrolyte membrane 33. As the constituent material of the solid polymer electrolyte membrane 33, the ion-exchange resin are preferable, which includes polar groups such as strong acid groups, for example, sulfonate groups, phosphate groups, phosphonic groups, and phosphine groups, or such as weak acid groups, for example, carboxyl groups. Specifically, perfluorosulfonic resin, sulfonated polyethersulfonic resin, are sulfonated polyimide resin are given as examples. More specifically, given is a solid polymer electrolyte membrane including aromatic polymer, for example, sulfonated poly(4-phenoxybenzoyl-1,4-phenylene), sulfonated polyetheretherketone, sulfonated polyethersulfone, sulfonated polysulfone, sulfonated polyimide, and alkylsulfonated polybenzoimidazole. A thickness of the solid polymer electrolyte membrane can be arbitrarily selected within a range approximately from 10 to 300 μm depending on its material and a usage of the fuel cell.

The cathode 31 is an electrode for reducing oxygen to produce water as shown in a following formula 3.

(Chemical formula 3);

The cathode 31 can be formed by coating, on a substrate such as a carbon paper, a catalyst layer including the proton conductive material and particles (including powders) with catalysts supported on catalyst support such as carbon or catalysts only having no catalyst support, for example. As the catalysts, platinum, rhodium, palladium, iridium, osmium, ruthenium, rhenium, gold, silver, nickel, cobalt, molybdenum, lanthanum, strontium, and yttrium are given as examples. As the catalysts, only one kind of them or a combination of two or more of them may be used. As the particles supporting the catalysts, carbon materials such as acetylene black, Ketjen black, carbon nanotube, and carbon nanohorn is given as examples. A size of the particles is arbitrarily selected within a range approximately from 0.01 to 0.1 μm, and preferably within a range approximately from 0.02 to 0.06 μm when the carbon materials are, for example, particulates. To make the particles support the catalysts, impregnating method can be employed for example.

As a substrate forming the catalyst layer, the solid polymer electrolyte membrane can be employed and porous materials having the electric conductivity such as carbon papers, carbon compacts, carbon sintered compacts, sintered metals, foam metals can be also employed. When the substrate such as the carbon papers is employed, it is preferable to join the cathode 31 to the solid polymer electrolyte membrane 33 in a direction where the catalyst layer contacts the solid polymer electrolyte membrane 33, through a method such as the hot press, after the cathode 31 is obtained by forming the catalyst layer on the substrate. A catalyst quantity per unit area of the cathode 31 can be arbitrarily selected within a range approximately from 0.1 mg/cm² to 20 mg/cm² depending on a kind and size of the catalyst.

The anode 32 is an electrode for generating hydrogen ions, $CO_2$, and electrons from aqueous methanol solution and water as shown in a following formula 4 and is formed in a manner similar to the cathode 31.

(Chemical formula 4);

The catalyst layer and substrate composing the anode 32 may be the same as the catalyst layer and the substrate composing the cathode 31 and also may be different. Similar to the case of the cathode, a catalyst quantity per unit area of the anode 32 also can be arbitrarily selected within a range approximately from 0.1 mg/cm² to 20 mg/cm² depending on a kind and size of the catalyst.

The cathode power collector 41 and the anode power collector 42 are arranged on the cathode 31 and the anode 32, respectively, and acts to improve extracting efficiency of electrons and supplying efficiency of the electrons. These power collectors 41 and 42 may be a frame-shape contacting a periphery portion of the MEA and may be a plane or a mesh form contacting an entire surface of the MEA. In the case of the plane form, through-holes into which the fuel and the air can flow are regularly or irregularly arranged and an area where the through-holes are not arranged contacts with the electrode to collect the electric power. The frame-shaped power collector is shown as the cathode power collector 41 and the anode power collector 42 in the explanation of the present invention. However, these are just one example and do not restrict the present invention. For example, stainless steals, sintered metals, and foam metals, or these metals plated by metal materials with a highly conductive property and conductive materials such as carbon materials can be employed as the materials of the power collectors 41 and 42.

To the unit fuel cells 11 of the present invention, a plurality of seal members having a sealing function is provided. For example, as shown in FIG. 6: (a) the seal member 43 having the same thickness as that of the cathode 31 is provided in a frame-shape to a periphery portion of the cell structure between the solid polymer electrolyte membrane 33 and the cathode power collector 41, (b) the seal member 43 having the same thickness as that of the anode 32 is provided in a frame-shape to a periphery portion of the cell structure between the solid polymer electrolyte membrane 33 and the anode power collector 42, and (c) the seal member 43 having an arbitrary thickness is provided between the anode power collector 42 and the frame 10. In addition, it is preferable that the respective seal members having a sealing property, an insulation property, and elasticity and generally preferable that the members are formed of rubbers and plastics having the sealing property. Specifically, it is preferable to employ plastic materials such as the PTFE, the PET, the PEEK, and the vinyl chloride and rubber materials such as fluoric resin rubbers, silicon rubbers, and butyl rubbers.

As the wicking member 60, woven fabrics, nonwoven fabrics, fiber mats, fibrous webs, foam plastics can be used for example. It is especially preferable to use hydrophilic materials such as hydrophilic urethane foam materials and hydrophilic glass fibers.

As described above, according to the fuel cell system 1 of the present exemplary embodiment, since the condensation water holding member (mesh 71) is provided, moisture condensed at the lower stream side of the air flow is kept on the lid 70 side to avoid an occurrence of the flooding. In addition, the water kept at the lower stream side spreads to the easily dried upper stream side via the mesh 71, and humidity on the upper stream side can be increased. Thereby, decreasing of the ion conductivity on the upper stream side due to lack of water can be suppressed.

It is required to set an electric voltage in high in response to apparatuses, and it is required to increase the number of the unit fuel cells 11 in order to obtain a desired electric power when the fuel system 1 is used as an electric power source for the laptop PC consuming large electric power. When the unit fuel cells 11 increase, humidity at the lowest stream of the air flow also increases. Since the flooding of the fuel cells 11 positioned at the lowest stream of the air flow can be prevented even in such situation, the fuel cell system 1 according to the present exemplary embodiment is especially preferable to be used for apparatuses consuming large electric power.

In addition, in a case of a planar stack type fuel cell, the plurality of the unit fuel cells 11 are connected electrically in series. On this occasion, the plurality of the unit fuel cells 11 are generally arranged in a grid shape for space saving. When the unit fuel cells 11 have been arranged in this manner, pairs of the spatially adjoining unit fuel cells 11 are there, although electrically interleaving several fuel cells 11. Between the unit fuel cells 11 adjoining in this manner, great difference of electrical potential is produced between the cathodes 31. The spatially adjoining two cathodes 31 sometimes short-circuit because of the flooding. On the other hand, in the present exemplary embodiment, since the mesh 71 is attached to back of the lid 70, the condensation water is absorbed before the adjoining unit fuel cells 11 are connected and a possibility of the short-circuit can be decreased.

Meanwhile, in the present exemplary embodiment, the case where the cathodes 31 of all of the plurality of the unit fuel cells 11 are arranged so as to face upward has been described. However, all the cathodes 31 are not necessarily required to face upward. The cathode 31 in at least one of the unit fuel cells 11 is required to face upward and the unit fuel cells 11 facing the anode 32 upward may exist. A fuel supply to the upward anode 32 can be realized by devising a passage structure. In the fuel cell stack 15 facing the cathode 31 upward in at least one unit fuel cell, the condensation water can be kept by providing the mesh 71 and an occurrence of the flooding in the unit fuel cell can be suppressed.

The fuel cell system of the present invention will be specifically explained below by showing examples.

First Example

A structure of a fuel cell used in a first example will be explained below. In the present example, the fuel cell system 1 shown in FIG. 2 is manufactured.

At first, catalyst-supporting carbon fine particles which supports platinum fine particles with a particle diameter within a range from 3 to 5 nm at 50% ratio by weight on carbon particles (the KETJENBLACK EC600JD manufactured by LION Co.) was prepared. By adding 5% by weight of Nafion solution (name of commodity; DE521, the "Nafion" is a registered trade mark of Dupont Co.) into 1 g of the catalyst-supporting carbon fine particles and agitating the solution, catalyst paste for forming the cathode was obtained. By coating the catalyst paste on carbon paper (TGP-H-120 manufactured by Toray Co.) as a substrate at a coating amount from 1 to 8 mg/cm$^2$ and drying it, the cathode 31 of 4 cm×4 cm was manufactured. Meanwhile, a catalyst paste for forming an anode was obtained under a same condition as that in obtaining the catalyst paste for forming the above-mentioned cathode except to use platinum (Pt)-ruthenium (Ru) alloy fine particles (a ratio of Ru is 50 at %) with a particle diameter within a range from 3 to 5 nm instead of the platinum fine particles. Except for the use of the catalyst paste, the anode 32 was produced under the same condition as that in producing the above-mentioned cathode.

Next, after using a membrane of 8 cm×8 cm×180 μm (thickness) formed of Nafion 117 of Dupont Co. (250000 number average molecular weight) as the solid polymer electrolyte membrane 33, arranging the above-mentioned cathode 31 on one surface in a thickness direction of the membrane so that the carbon paper can face outside, and arranging the above-mentioned anode 32 on the other surface so that the carbon paper can face outside, they were hot-pressed from the outsides of the respective carbon papers. Thereby, the cathode 31 and the anode 32 were joined to the solid polymer electrolyte membrane 33 and the MEA (Membrane and Electrode Assembly) 13 was obtained.

Next, the power collectors 41 and 42 formed of a rectangular-framed casing board made of stainless steal (SUS316) having an outer size of 6×6 cm$^2$, 1 mm of thickness, and 11 mm of width were arranged on the cathode 31 and the anode 32. Moreover, the seal member 43 formed of a rectangular-framed casing board made of silicon rubber having an outer size of 6×6 cm$^2$, 0.3 mm of thickness, and 10 mm of width were arranged between the solid polymer electrolyte membrane 33 and the anode power collector 42. In addition, between the solid polymer electrolyte membrane 33 and the cathode power collector 41, the seal member 43 formed of a rectangular-framed casing board made of silicon rubber having an outer size of 6×6 cm$^2$, 0.3 mm of thickness, and 10 mm of width were arranged also as the other seal member. Portions of the solid polymer electrolyte membrane 33 protruding outside the power collectors 41 and 42 were cut off.

As the frame 10 composing the fuel cell system 1, the frame formed of fluorine resin having an outer size of 19.5 cm×14.5 cm×1 cm thickness was used. Six fuel cell tank parts 12 were formed inside the frame 10 so that the fuel cells 11 can be arranged in a matrix shape of 2 columns×3 rows. The passage structure is constituted so that the fuel can be supplied from the stack fuel inlet 21 and can be supplied for the respective unit fuel cells through the fuel paths 23 provided between the unit fuel cells 11 as shown in the cross sectional view of FIG. 2, and so that the fuel exhausted to the fuel paths 23 provided to both sides of the fuel cell stack 15 can be exhausted from the stack fuel outlet 22. The respective fuel tank parts 12 are containers having an inner size of 4×4 cm and 5 mm depth, and the wicking member 60 formed of a urethane material is inserted into the fuel tank part 12 as the fuel holding material.

The MEA 13, the cathode power collector 41, the anode power collector 42, and the seal members 43 were arranged on the above-mentioned fuel tank part 12 and they were screwed and integrated by the predetermined number of screws, the fuel cell stack 15 that is an aggregation of the unit fuel cells 11 and the fuel tank parts 12 according to the first example was obtained.

The unit fuel cells 11 were electrically connected in series via the power collectors of the adjoining fuel cells 11. In FIG. 2, a minus terminal 421 is retrieved from the unit fuel cells 11 positioned left below and a plus terminal 411 is retrieved from the unit fuel cells 11 positioned right below.

The chassis 14 housing the fuel cell stack 15 formed as described above will be explained. As for the chassis body 140, an acrylic board having a size of 1 mm thickness×20 cm long side×15 cm short side is used as a bottom surface, and acrylic boards having a size of 1 mm thickness×20 cm long side×1 cm height are arranged as partitions only on both sides on long sides of the acrylic board. That is, in the cross sectional view of FIG. 2, the upper side and the lower side in a direction vertical with respect to the paper surface are opening portions (the stack aspiration opening portion 24 and the stack exhaust opening portion 25). The fuel cell stack 15 is introduced in the chassis body 140, and the upper surface of the fuel cell stack was covered with the acrylic lid 70 on which the plastic mesh 71 of 100 mesh is attached as shown in FIG. 2. The size of the lid 70 was 1 mm thickness×20 cm long side×15 cm short side, and the size of the mesh 71 was 20 cm long side×15 cm short side similar to the lid 70. In the first example, the structure is employed in which the mesh 71 is sandwiched between the partition and the lid 70.

In the power generation, the air flow was formed on the surface of the cathode 31 of the unit fuel cells 11 by introducing the air from the stack aspiration opening portion 24 and exhausting the air from the stack exhaust opening portion 25. The blowing of the air was performed by using a compact fan, and a sufficient amount of the air for the power generation was supplied.

Second Example

A structure of a unit fuel cell used in a second example will be explained below. A manufacturing method and a structure of the MEA are the same as those of the first example, and a structure of the fuel cell stack 15 is also the same as that of the first example. Other conditions are also the same if not other mentioned below.

As for the second example, the fuel cell system 1 shown in FIG. 3 was manufactured. That is, only arrangement of the mesh 71 in the first example was changed. A size of the mesh 71 is 20 cm long side×14.5 cm short side so that the mesh 71 cannot be sandwiched between the partitions provided on both sides of the chassis body 140 and the lid 70.

Third Example

A structure of a unit fuel cell used in a third example will be explained below. A manufacturing method and a structure of the MEA are the same as those of the first example, and a structure of the fuel cell stack 15 is also the same as that of the first example. Other conditions are also the same if not other mentioned below.

As for the third example, the fuel cell system shown in FIG. 4 was manufactured. That is, the shape of the mesh in the first example was changed. A size of the mesh is 20 cm long side×14.5 cm short side so that the mesh 71 cannot be sandwiched between the partitions provided on both sides of the chassis body 140 and the lid 70. Furthermore, in a clearance between the unit fuel cells 11 forming two rows, the mesh 71 is divided with keeping a clearance of 0.5 cm.

Fourth Example

A structure of a unit fuel cell used in a fourth example will be explained below. A manufacturing method and a structure of the MEA are the same as those of the first example, and a structure of the fuel cell stack 15 is also the same as that of the first example. Other conditions are also the same if not other mentioned below.

Figure 7:
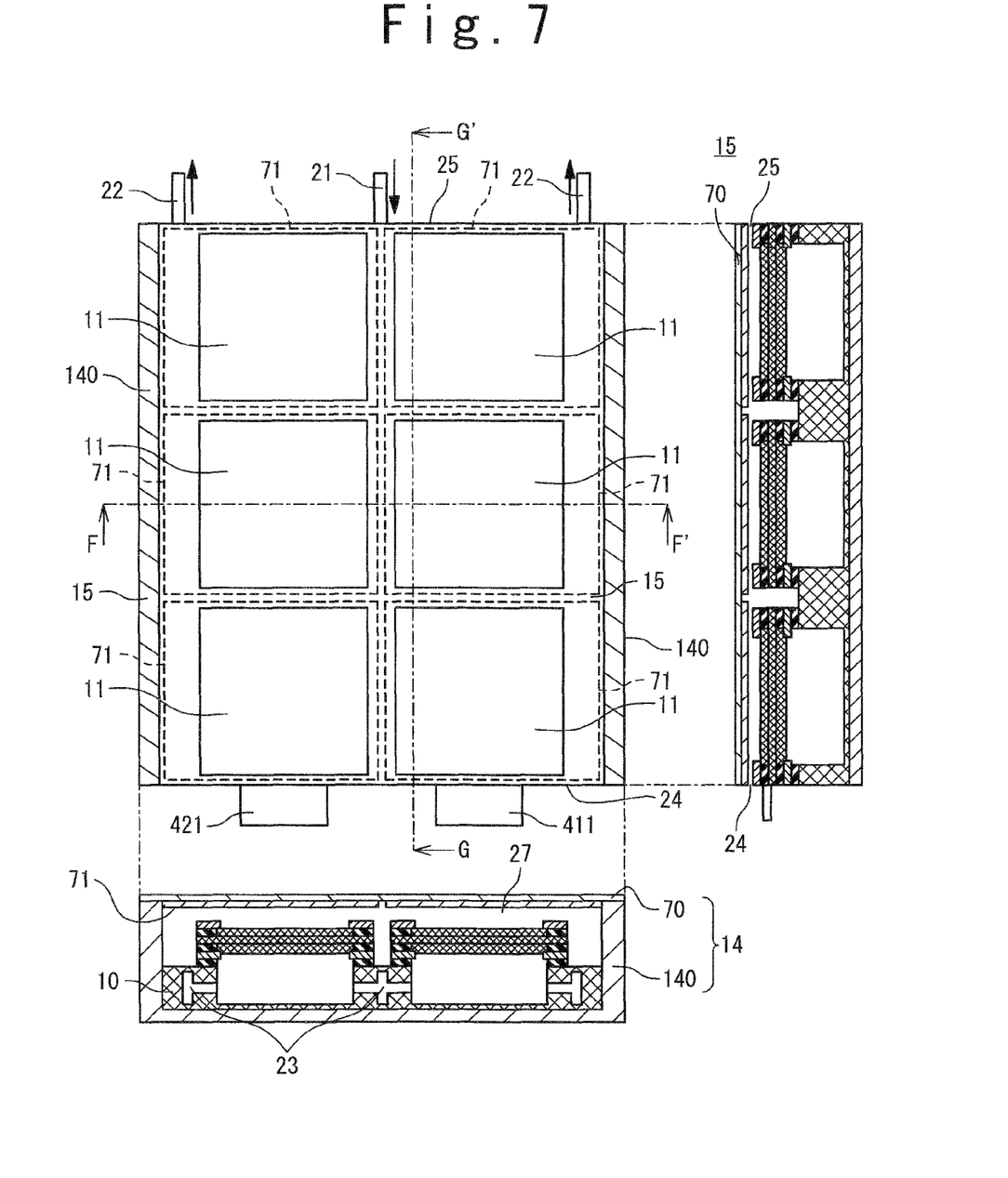
FIG. 7 is a top view and cross sectional views along FF' and GG' showing an appearance of a state where a fuel cell stack of the present invention is housed in a chassis.

As for the fourth example, the shape of the mesh in the first example was changed. A size of the mesh is 6 cm long side×7 cm short side. As shown in FIG. 7, the mesh 71 is attached to a position corresponding to each of the unit fuel cells 11, and is divided between the adjoining unit fuel cells 11. That is, corresponding to six unit fuel cells 11, six meshes 71 were arranged.

Comparative Example 1

A structure of a unit fuel cell used in a comparative example 1 will be explained below. In the comparative example 1, the fuel cell system 1 as shown in FIG. 1 was used without providing the mesh 71. A manufacturing method and a structure of the MEA are the same as those of the first example, and a structure of the fuel cell stack 15 is also the same as that of the first example. Other conditions are also the same if not other mentioned below. As for comparative example 1, the structure is the same as that of the first example other than that the mesh 71 is not attached to back of the lid 70.

Experimental Result

Figure 8:
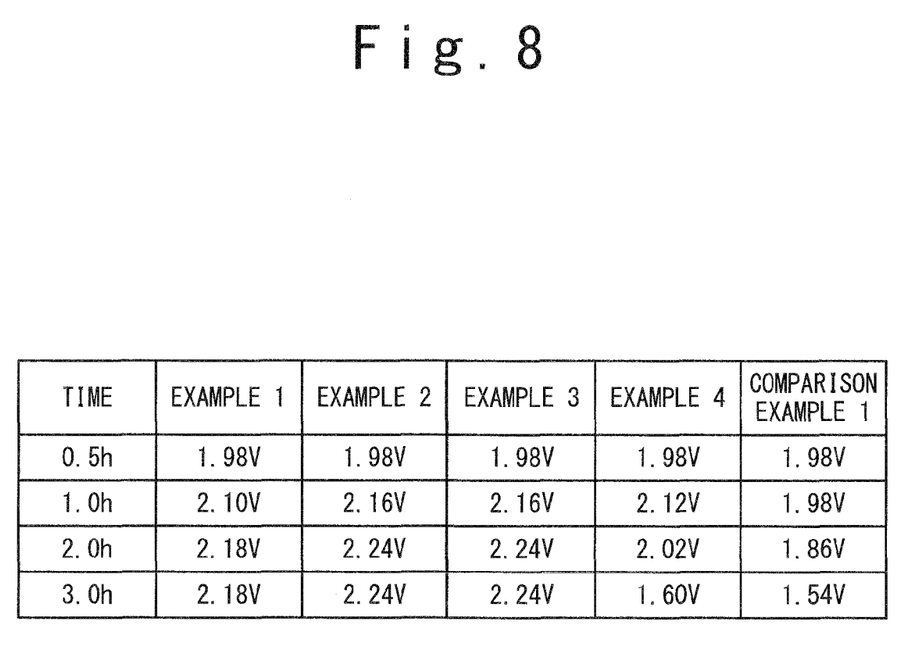
FIG. 8 is a table collectively showing experimental results related to the present invention.

As for the first to fourth examples and the comparative example 1, following tests of the power generation were carried out. By supplying 1000 mL of 10 vol % aqueous methanol solution for respective fuel cell stack 15 at a flow rate of 10 mL/min in circulation, the tests of the power generation were carried out for three hours at a current value corresponding to a current density of 100 mA/cm$^2$ in the atmosphere of 25° C. and 50%, and change in voltage at that time was monitored after 0.5, 1, 2, and 3 hours. FIG. 8 shows the results in each condition.

In the comparative example 1, the power generation was stable until 1 hour passed, however, the voltage shows sign of dropping after two hours passed and the voltage significantly dropped after three hours passed. When the lid 70 is opened after the power generation, the cathode 31 was wet because of the flooding. Especially in the cathode 31 positioning at the lower stream of the air flow, the flooding was notably found.

In the first example, the voltage was the same as that of the comparative example 1 until 0.5 hours passed. In addition, the power generation was stable even after two hours passed and the flooding was not found even after three hours passed. When the lid 70 is opened after the experiment, the flooding of the cathode 31 did not occur although the condensation was slightly found between the mesh 71 positioning at the lower stream portion of the air flow and the lid 70.

In the second example, the stable power generation could be continued as well as the first example. When comparing the first to the second examples, the electric voltage in the second example was higher than that in the first example. It can be considered, as a reason of this, that, while the mesh 71 is opened only at the stack aspiration opening portion 24 and the stack exhaust opening portion 25 in the second example, the temperature and the humidity in the first example become higher since the mesh 70 is sandwiched between the lid 70 and the partitions of the chassis 13 in the first example. When the lid 70 is opened after the measurement in the second example, the condensation water was found on the mesh 71 but the lid 70 and the flooding was not found on the cathode 31. In addition, a spread of the condensation water between the mesh 71 and the lid 70 was getting wider to the lower stream side of the air flow and a part of the water spread to the top of the cathode 31 positioning at a higher stream in the air flow.

In the third example, the change in the electric voltage is almost the same level as that in the second example. When the lid 70 is opened after the measurement in the second example, the flooding was not found on the cathode 31 and the condensation water was found on the mesh 71 but the lid 70. A spread of the condensation water in the third example was found on the upper stream side of the air flow more than that of the case of the second example. It could be confirmed that, because the condensation water spread through the mesh 71 on the surface of the cathode 31 in upper stream side more than the air flow, the humidity in its surroundings increases, and effect for improving a humidity environment on the upper stream side of the air flow easily becoming in relatively low humidity can be easily obtained.

In the fourth example, a high electromotive force was maintained as compared to the comparative example 1. However, since the flooding could be avoided by the mesh 71 but the condensation water could not spread to the top of the adjoining fuel, cell 11 via the mesh, a tendency of the flooding could be slightly found in the cathode 31 positioning at the lowest stream of the air flow when the lid 71 is opened after the completion of the measurement.

As described above, it could be confirmed that the flooding in the cathode 31 is solved, the more homogeneous power generation environment can be realized further, and the more stable power generation can be continued when the methods of the present invention shown in the first to fourth examples is employed. This method is available for a fuel cell stack requiring large electric power consumption such as the planar stack type fuel cell and allows the fuel cell being mounted on a portable device requiring a relatively high output such as the PC.

The invention claimed is:

1. A fuel cell system comprising:
   a fuel cell stack configured to have a plurality of unit fuel cells arranged on an identical plane;
   a chassis configured to cover at least one side of said fuel cell stack via an air flow space for supplying oxidant gas to said plurality of unit fuel cells; and
   a condensation water holding member configured to be provided in at least a part between said fuel cell stack and said chassis, the condensation water holding member having a mesh shape and configured for keeping moisture,
   wherein when electric power is generated, oxidant gas flows in one direction in said air flow space,
   wherein said condensation water holding member is shared by unit fuel cells adjoining in said direction where said oxidant gas flows, and is separated for unit fuel cells adjoining in a direction vertical to said direction where said oxidant gas flows.

2. The fuel cell system according to claim 1, wherein at least a part of said condensation water holding member is bared to outside.

3. A fuel cell system comprising:
   a chassis (14) comprised of a chassis body (140) and a lid (70),
   the chassis body having a rectangular base and four side surfaces upwardly standing from facing sides of the rectangular base, the chassis body having a rectangular solid shape with an open top surface, a first of the side surfaces providing a stack aspiration opening portion (24) and a second of the side surfaces providing a stack exhaust opening (25),
   the lid closing the open top surface of the chassis body;
   a fuel cell stack (15) comprised of a stack of a plurality of unit fuel cells (11) arranged on an identical plane, the fuel cell stack housed in the chassis, an air flow space (27) located around the fuel cell stack (15), the air flow space for supplying oxidant gas to said unit fuel cells,
   each unit fuel cell (11) arranged with a cathode (31) oriented upward, a cathode power collector (41) provided on the cathode (31) of each unit fuel cell (11), with a central portion of a top surface of the cathode (31) contacting the air flow space (27) allowing air flowing in the air flow space (27) to be supplied to the cathode (31) as the oxidant gas, the air being supplied into the air flow space (27) from the stack aspiration opening portion (24), passing on the cathodes (31) of the respective unit fuel cells (11) and exhausted from the stack exhaust opening portion (25) to outside; and
   a condensation water holding mesh (71) shaped for keeping moisture and spaced apart from the fuel cell stack (15), the condensation water holding mesh (71) provided over the open top surface of the chassis body between a top edge of the four side surfaces and a lower surface of the lid (70) closing the open top surface of the chassis body, side parts of the condensation water holding mesh (71) being exposed to an outside of the chassis body thereby allowing condensation water kept by the condensation water holding mesh (71) to be released from the side parts of the condensation water holding mesh (71) to the outside.

4. The fuel cell system according to claim 3, wherein the condensation water holding mesh (71) is a 40 to 200 mesh element.

5. The fuel cell system according to claim 3, wherein the condensation water holding mesh (71) is woven in a grid, and weft yarns and warp yarns in said grid are woven so as to be arranged in a parallel direction and a vertical direction to a direction where said oxidant gas flows, respectively.

6. A fuel cell system comprising:
   a chassis (14) comprised of a chassis body (140) and a lid (70),
   the chassis body having a rectangular base and four side surfaces upwardly standing from facing sides of the rectangular base, the chassis body having a rectangular solid shape with an open top surface, a first of the side surfaces providing a stack aspiration opening portion (24) and a second of the side surfaces providing a stack exhaust opening (25),
   the lid closing the open top surface of the chassis body;
   a fuel cell stack (15) comprised of a stack of a plurality of unit fuel cells (11) arranged on an identical plane, the fuel cell stack housed in the chassis, an air flow space (27) located around the fuel cell stack (15), the air flow space for supplying oxidant gas to said unit fuel cells,
   each unit fuel cell (11) arranged with a cathode (31) oriented upward, a cathode power collector (41) provided on the cathode (31) of each unit fuel cell (11), with a central portion of a top surface of the cathode (31) contacting the air flow space (27) allowing air flowing in the air flow space (27) to be supplied to the cathode (31) as the oxidant gas, the air being supplied into the air flow space (27) from the stack aspiration opening portion (24), passing on the cathodes (31) of the respective unit fuel cells (11) and exhausted from the stack exhaust opening portion (25) to outside; and
   a condensation water holding mesh (71) shaped for keeping moisture and spaced apart from the fuel cell stack (15), the condensation water holding mesh (71) embedded in the open top surface of the chassis body (140) with side portions of the condensation water holding mesh (71) contacting to an inside of the side surfaces of the chassis body (140) and not bared to an outside of the chassis body (140) thereby trapping the moisture trapped by the condensation water holding mesh (71) within the chassis body (140) preventing exhaust to the outside.

7. The fuel cell system according to claim 6, wherein the condensation water holding mesh (71) is a 40 to 200 mesh element.

8. The fuel cell system according to claim 6, wherein the condensation water holding mesh (71) is woven in a grid, and weft yarns and warp yarns in said grid are woven so as to be arranged in a parallel direction and a vertical direction to a direction where said oxidant gas flows, respectively.

* * * * *